United States Patent [19]
Thomas

[11] 3,928,204
[45] Dec. 23, 1975

[54] INTERCONNECTORS FOR SPIRAL-WOUND FILTRATION MODULES

[76] Inventor: Frank A. Thomas, 309 Reese St., Greenwood, Wis. 54437

[22] Filed: June 27, 1974

[21] Appl. No.: 483,628

[52] U.S. Cl. ................ 210/232; 210/321; 210/494
[51] Int. Cl.² ........................................ B01D 31/00
[58] Field of Search ........... 210/232, 321, 323, 433, 210/495, 494; 285/53, 55, 417

[56] References Cited
UNITED STATES PATENTS

| | | | |
|---|---|---|---|
| 3,432,186 | 3/1969 | Braun | 285/53 |
| 3,437,357 | 4/1969 | Rubin | 285/55 |
| 3,784,470 | 1/1974 | Richardson et al. | 210/494 X |
| 3,813,334 | 5/1974 | Bray | 210/494 |
| 3,817,387 | 6/1974 | Bachle et al. | 210/433 |
| 3,827,564 | 8/1974 | Rak | 210/494 |
| 3,827,727 | 8/1974 | Moeblus | 285/417 |

Primary Examiner—Theodore A. Granger

[57] ABSTRACT

The permeate tubes of spiral-wound, reverse osmosis or ultrafiltration modules are serially joined to one another by tubular connectors lined with resilient sealing material. The lining extends beyond the ends of the connectors and is tapered to seal the connector and the permeate tubes under normal operating pressures. A resilient washer may be interposed between adjoining ends of the permeate tubes within the interconnectors as an integral part of said interconnectors for absorbing the hydraulic shock which normally occurs when flow directions are reversed in filtration units including such spiral-wound modules. Specially constructed anti-telescoping devices adapted for engaging the interconnectors and the ends of the spiral-wound modules are also disclosed.

13 Claims, 4 Drawing Figures 3,928,204

INTERCONNECTORS FOR SPIRAL-WOUND FILTRATION MODULES

BACKGROUND OF THE INVENTION

This invention relates generally to the art of reverse osmosis and ultrafiltration, and in particular, to reverse osmosis or ultrafiltration devices which include serially arranged, spiral-wound filtration modules. Such modules have been used in recent years for many filtration jobs including the desalting and purification of water and the concentration and separation of food materials. Recently, it has been proposed to separate proteins from cheese whey using spiral-wound modules as the filtration media.

In ultrafiltration an impure solution or a solution to be concentrated is brought into contact with a semipermeable membrane. A pressure is applied to the solution to force liquid (the permeate) through the membrane, thereby filtering or concentrating the initial solution. Membranes can be selected for a particular use by comparing the average porosity of the membrane and the size or molecular weight of the solute or particles of the starting solution. For the separation of proteins from cheese whey, cellulose acetate membranes are suitable. Moreover, membranes may be of several different types, e.g., hollow tubes, flat plates, spirally-wound, etc. In the spiral-wound system, four or more flat sheets of membrane material are wound around a perforated permeate collection tube. Fluid flow through the modules is unidirectional, i.e., permeate passes through the membrane to the collection tube, while the concentrated residue passes alongside the membrane to be collected or discarded. The membrane sheets are sealed on three of the four edges and the fourth edge is sealed to the collection tube and communicates therewith through the perforations. Examples of prior art spiral-wound modules are described in U.S. Pat. Nos. 3,695,446, 3,367,504, 3,367,505 and 3,456,803, and in U.S. application Ser. No. 362,828 filed May 22, 1973 now U.S. Pat. No. 3,880,755, entitled "Method and Apparatus for Separating Cheese Whey Proteins" filed by the present inventor and D. Dean Spatz.

An important part of such prior art modules are the retainers or anti-telescoping devices which cap each end of the modules to prevent them from telescoping under the pressures used in ultrafiltration jobs. The retainers are normally flat plates provided with a plurality of holes through which the concentrate may pass from one module to the next.

In many prior art machines using a plurality of serially arranged spiral-wound modules, individual units were interconnected by a plastic sleeve surrounding abutting ends of permeate tubes of adjoining modules. Grooves formed near the ends of the tubes accommodated rubber O-rings to seal the tubes and the connecting sleeves. The ends of abutting module permeate tubes were normally touching in such prior art systems.

While these prior art retainers and connectors are satisfactory for many reverse osmosis or ultrafiltration devices, they are unsuitable for use in ultrafiltration apparatus used in food processing, especially in machines used to separate proteins from cheese whey. In the latter machines, dead spots in the product flow path serve as sites for bacterial growth and the problem cannot be remedied completely by reversing product flow to clean the system. No matter which way concentrate flows through a plurality of adjoining spiral-wound modules, dead spots are found near the retainers or O-rings, and since milk proteins form an excellent base for bacterial growth, the situation cannot be tolerated. Moreover, the Food and Drug Administration and other health agencies will not approve dairy equipment which cannot be thoroughly cleaned. Finally, touching ends of adjacent module permeate tubes are subjected to a hammering action each time product flow is reversed. Those hydraulic shocks decrease the useful lifetime of modules and can result in leaks in the system.

SUMMARY OF THE INVENTION

It is a primary object of the present invention to provide a new and improved system for interconnecting spiral-wound membrane modules, which system is free from dead spots and which can be thoroughly cleaned by forward and reverse product flow.

Another object of the present invention is to provide anti-telescoping devices for spiral-wound modules which are substantially cleanable by product flow.

A further object of the present invention is to provide a combination interconnector and anti-telescoping device which combination is substantially cleanable under normal operating conditions.

A still further object of the present invention is to provide module interconnectors and anti-telescoping devices which allow rapid replacement of membrane modules and easy servicing of the entire unit.

How these and other objects of the present invention are accomplished will be described in detail in the following specification taken in conjunction with the drawings. Generally, however, the interconnectors of the present invention comprise rigid sleeves lined with resilient materials, the bore of which is adapted to fit snugly over adjoining ends of permeate collection tubes of spiral-wound membrane modules. The resilient lining is longer than the sleeve and the exposed portions thereof are tapered from the end of the sleeve to a point at the surface of a permeate tube. This exposed lip forms an effective seal under normal operating pressures. Additionally, a resilient washer having roughly the same cross section as the permeate tubes is made a part of interconnector at the center thereof between abutting ends of the permeate tubes to absorb hydraulic shock when product flow is periodically reversed through the series of membranes. Finally, a specially constructed anti-telescoping device designed for thorough cleanability engages both the connecting sleeve and the rolled end of one spiral-wound module. The connecting sleeve prevents tilting, longitudinal and radial movement of the anti-telescoping device within the pressure vessel enclosing the modules.

DESCRIPTION OF A PREFERRED EMBODIMENT

Figure 1:
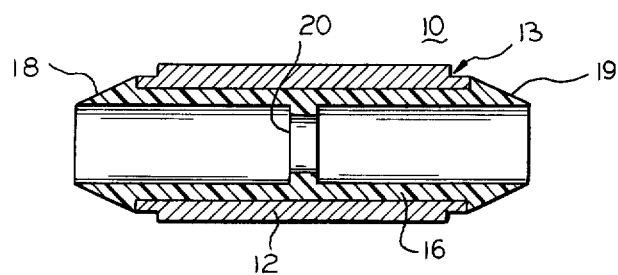
FIG. 1 is a longitudinal cross section of a tubular interconnector according to a preferred embodiment of the present invention.

FIG. 1 shows an interconnector 10 according to a preferred embodiment of the present invention. Interconnector 10 includes a hollow cylindrical sleeve 12 which includes a shoulder 13 at each end and a bore 14. The dimension of sleeve 12 can, of course, vary depending on the particular dimensions of the permeate tubes with which interconnector 10 is to be used, but solely by way of example, sleeve 12 may have an overall length of approximately 2.56 inches, an outside diameter of 1.56 inches and a bore of approximately 1.10 inches (yielding a thickness for the sleeve of approximately 0.23 inches). Shoulder 13 may have a length of approximately ⅛ inch at each end and a depth of approximately ⅛ inch. Such an interconnector 10 is useful with certain commercially available spirally-wound ultrafiltration membranes such as the ones sold by Osmonics, Inc. of Hopkins, Minnesota.

Bore 14 of sleeve 12 is lined with a resilient liner material 16 which preferably is bonded directly to sleeve 12. Liner 16 is longer than sleeve 12 (including shoulder portions 13) and surrounds the terminal ends of sleeve 12. From the ends of sleeve 12 the liner is gradually tapered at its ends 18 and 19 to a fine annular lip, the taper extending gradually from the shoulder at each end of sleeve 12 inwardly toward the axis of sleeve 12. Again, only by way of example, liner 16 may have an overall length of approximately 3.50 inches and a thickness of 0.10 to 0.15 inches so that commercially available permeate tubes will fit snugly within liner 16.

In the preferred form of the present invention, a resilient washer is integrally bonded to liner 16 at the approximate midpoint of interconnector 10. Washer 20 can have a thickness of approximately 0.25 inches and preferably external and internal diameters similar to those of permeate collection tubes to be connected by interconnector 10. The function of liner 16 and washer 20 will be more fully described in connection with FIG. 4.

A wide variety of materials can be used for constructing sleeve 12, liner 16 and washer 20. Preferably sleeve 12 is constructed from 3-A stainless steel, but other metal or plastic materials can be used. Stainless steel is preferred because of its strength and also because of its cleaning characteristics, a particularly important characteristic when selecting materials for food processing machinery. Liner 16 and washer 20 are preferably constructed from buna rubber (approximately 60 durometer), however, any number of pliable materials may be selected which will bond to sleeve 12 and which possess the desired pliability and resiliency to effectively seal the permeate tubes within interconnector 10.

Figure 2:
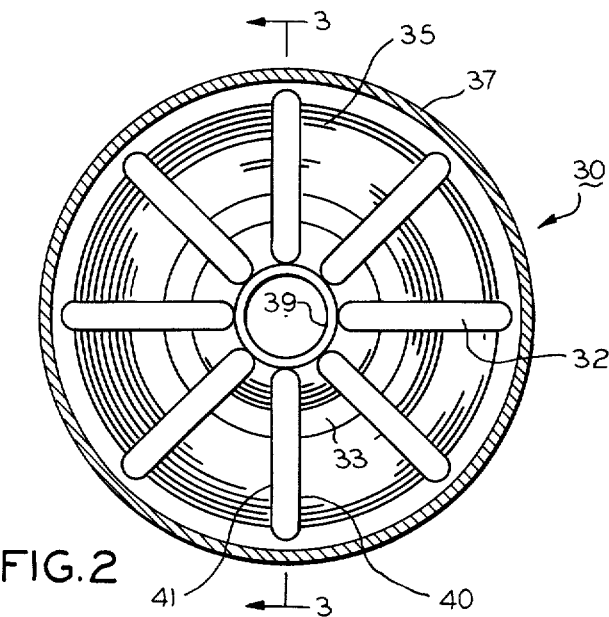
FIG. 2 is an end view of an anti-telescoping device according to a preferred embodiment of the present invention.
Figure 3:
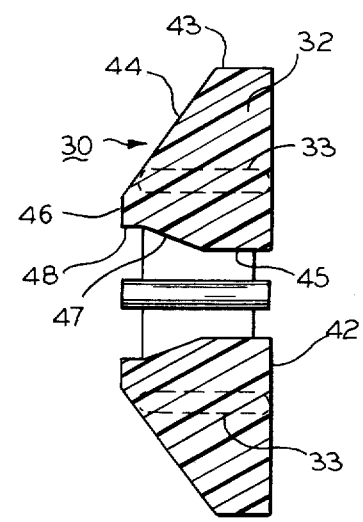
FIG. 3 is a view taken along the line 3—3 of FIG. 2.

FIGS. 2 and 3 illustrate a preferred form of anti-telescoping device which may be used in combination with interconnectors 10. Essentially device 30 comprises a plurality of finger-like retaining plates 32 held in position by an annular support 33. In the embodiment shown by the drawings, there are eight equally-spaced plates 32, however, depending on the types of membranes employed and the size of the units, the number and dimensions of members 32 can be widely varied. In FIG. 2, a spiral-wound membrane module 35 is shown contained within a pressure vessel 37. Permeate collector tube 39 of module 35 is centrally aligned in vessel 37 and the retainer plates 32 extend in a spoke-like manner from the outside of permeate tube 39 toward pressure vessel 37. The maximum dimensions of plates 32 extend longitudinally in vessel 37, i.e., in the direction of product flow.

Plates 32 each include parallel faces 40–41 and four edges 42–45. While the plates may be rectangular, it is preferred to use the wedge shape illustrated in the Figures. A first edge 42 is square to faces 40 and 41 and is roughly equal in length to the rolled end of membrane 35 or approximately the distance between pressure vessel 37 and permeate tube 39. A slight clearance at the outer edge of anti-telescoping device 30 is especially preferred. The outer and inner edges 43 and 45 respectively are rounded and are parallel to one another. Edge 43 is shorter than edge 45, edge 43 being adjacent pressure vessel 37 and edge 45 contacting the permeate tube 39. Finally, edge 44 connects edges 43 and 45, intersecting edge 43 at an obtuse angle and edge 45 at an acute angle.

The area of each plate 32 near the junction of edges 44 and 45 is adapted for engaging shoulder 13 of sleeve 12 and the tapered portion of liner 16. Edge 44 is squared to permeate collection tube 39 at area 46 and edge 45 is further defined by tapered portion 47 and a squared portion 48 intersection portion 46 of edge 44.

A plurality of members 32 may be used to construct an anti-telescoping device 30, as has already been pointed out. Members 32 are arranged in a spoke-like manner with edges 42 of the plate being generally coplanar. To hold them in place, an oblong annular ring 33 is integrally bonded through faces 40 and 41 of plates 32. Ring 33 is preferably located intermediate edges 43 and 45 and is preferably inset from edge 42. An oblong configuration is preferred but is not required. Members 32 and 33 are preferably constructed of the same material and various plastics, metals or alloys can be used. Preferred construction materials, however, are stainless steel or synthetic plastic materials approved for use in food processing equipment.

Figure 4:
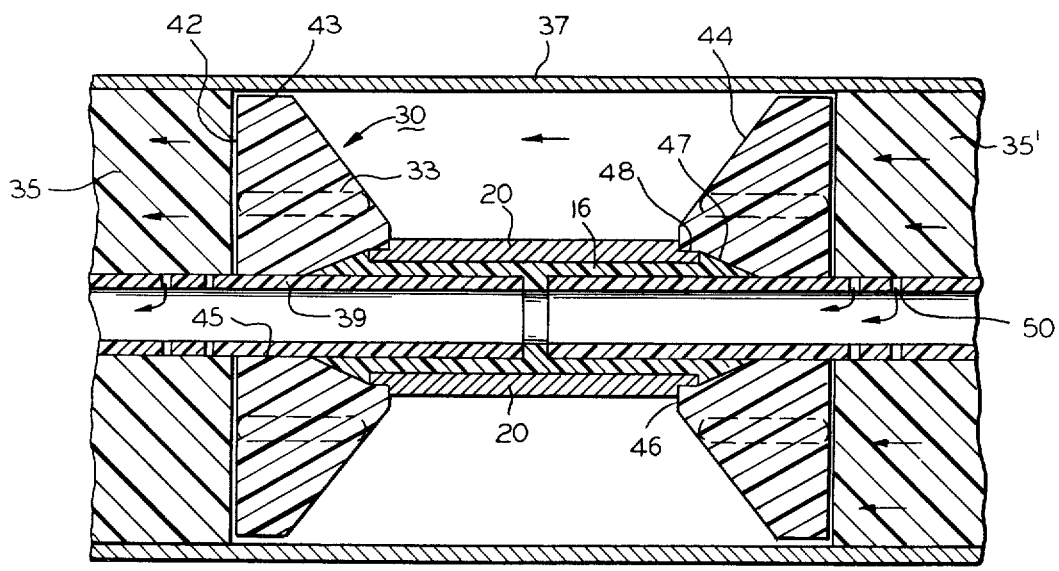
FIG. 4 is a side section of the interconnector of FIG. 1 and the anti-telescoping device of FIG. 2 together with portions of a pair of adjoining spiral-wound membrane modules.

FIG. 4 illustrates how interconnector 10 and anti-telescoping device 30 cooperate inside pressure vessel 37 to interconnect spiral-wound modules 35 and 35'. Ends of adjacent permeate collection tubes are placed into opposite ends of interconnector 10 so that they contact washer 20. The relationship of the permeate collection tube 39 and washer 20 can be noted from this FIGURE. It is also noticeable that portion 46–48 of anti-telescoping device 30 contacts shoulder 13 of interconnector 10 and the liner 16 thereof. Such contact at eight locations prevents anti-telescoping device 30 from shifting longitudinally, laterally or radially with respect to the ends of spiral-wound modules 35 and 35' and pressure vessel 37.

In operation, the solution to be concentrated or separated is passed through the spiral-wound modules in the directions shown by the arrows. Under pressure, which may be 200 pounds per square inch or more, permeate is forced through openings 50 in permeate collection tube 39 and travels along the permeate collection tube 39 to a suitable discharge or collection device (not shown). Permeate tube 39 is sealed with interconnector 10 by the pressure applied exteriorly against liner 16. Reversing product flow has no effect on the permeate flow, but only on the direction of flow through the membranes and hydraulic shock occasioned by such product flow reversal is absorbed by washer 20. Both the exterior surface of the interconnector 10 and the anti-telescoping device 30 are thoroughly cleaned by product flow through pressure vessel 37. Annular ring 33 is completely exposed to product flow as are edges 43, 44 and 45 of the anti-telescoping devices. These edges are rounded and are either completely open to product flow (edges 43 and 44) or have only minimal contact with other surfaces (edge 45 contacting permeate collection tube 39). Flat edges 42 contacting the rolled end of the spiral-wound modules are cleaned to some degree by product flow around these edges along faces 40 and 41. Minimal cleaning problems are encountered at the junction of shoulder 13 of interconnector 10 and portions 46 and 47 of device 30 since this area of contact is extremely small in relation to the overall surface area which needs to be cleaned.

In summary, the combination anti-telescoping device and interconnector system described hereinabove provides an effective sealing, support and cleaning system for use in food processing machinery, such as machinery used for separating proteins from cheese whey. Besides ease of replacement of membranes, interconnectors 10 provide more effective seals than those known to the art as lip 16 is constantly urged into sealing contact as pressures are increased during operation. Washer 20 aids in extending membrane and connector lifetimes by absorbing hydraulic shocks which have been a problem in the prior art without sacrificing cleanability or ease of replacement. Anti-telescoping devices 30 are thoroughly cleanable and still provide the necessary anti-telescoping and support functions which normally have been carried out by flat plates having numerous dead spots for bacterial growth. While the invention has been described in connection with the illustrated preferred embodiments, the invention is not to be limited thereby but is to be limited only by the claims which follow.

I claim:
1. A filtration apparatus comprising:
   at least one pressure vessel;
   a plurality of spiral-wound ultrafiltration modules serially arranged within each vessel, each of said modules including a filtration membrane spirally wound about a permeate collection tube, said tubes extending beyond the ends of said wound membrane; and
   means interconnecting and sealing adjacent ends of said permeate tubes comprising:
   a. a cylindrical sleeve surrounding and overlapping said adjacent ends and having an inside diameter exceeding the outside diameter of said tubes, and
   b. a resilient liner for said sleeve having a first portion bonded to the inner surface of said sleeve and a cylindrical interior surface having a diameter only slightly greater than the outside of said tubes whereby said tubes fit snugly within said lined sleeve, and wherein said liner is longer than said sleeve and includes end portions extending beyond the ends of said sleeve and engaging said tubes, whereby when pressure is increased in said vessel said end portions seal against said tubes.

2. The invention set forth in claim 1 wherein said end portions are tapered gradually toward said interior surface as the distance from the ends of said sleeve increases.

3. The invention set forth in claim 2 wherein said end portions include a further annular portion bonded to the ends of said sleeve and said taper extends from the exterior cylindrical surface of said sleeve to the interior cylindrical surface of said liner.

4. The invention set forth in claim 3 further including resilient washer means axially aligned in said sleeve between said adjoining ends of said tubes, said washer having an opening therein corresponding in size to and aligned with the openings of said tubes.

5. The invention set forth in claim 4 wherein said washer means is integral with said resilient liner.

6. The invention set forth in claim 5 wherein said sleeve is constructed of a material selected from the group consisting of metals and plastics and said liner and washer are constructed of a material selected from the group consisting of rubber and synthetic resilient materials.

7. An ultrafiltration system comprising a plurality of serially arranged spiral wound membrane modules disposed within a pressure vessel, said modules each comprising membrane material spirally rolled on a permeate collection tube, said tubes extending beyond the rolled ends of said membrane material, the improvement comprising means for interconnecting and sealing the adjacent ends of said permeate tubes and simultaneously preventing telescoping of said rolled membrane material when fluid to be filtered is injected under pressure into said vessel, including:
   a. an interconnector and sealing means comprising:
      i. a cylindrical sleeve surrounding and overlapping adjacent ends of said permeate tubes and having an inside diameter exceeding the outside diameter of said tubes;
      ii. a resilient liner for said sleeve having a first portion bonded to the inner surface of said sleeve and a cylindrical interior surface having a diameter only slightly greater than the outside of said tubes whereby said tubes fit snugly within said lined sleeve, and wherein said liner is longer than said sleeve and includes end portions extending beyond the ends of said sleeve and engaging said tubes, whereby when pressure is increased in said vessel said end portions seal against said tubes;
      iii. shoulder means formed at the ends of said sleeve means, and
   b. antitelescoping devices disposed between and engaging the rolled ends of each of said modules and said adjoining interconnector and sealing means and each comprising:
      i. a plurality of spoke-like retainer plate means radially arranged about the exposed portion of said permeate tubes, said plate means each being generally coplanar with the axis of said tubes and including a first edge, the first edges of said plurality of plate means being disposed in a common plane which is transverse and perpendicular to the axis of said tubes, said first edges engaging the rolled membrane material,
      ii. annular support means for said plate means, said support means having an axis coinciding with the axes of said tubes, and
      iii. a portion of each of said plate means engaging said shoulder portion of said interconnector and sealing means.

8. The invention set forth in claim 7 wherein said end portions of said interconnector and sealing means are tapered gradually toward said interior surface as the distance from the ends of said sleeve increases and wherein a further portion of each of said plate means engaging said tapered end portions of said liner.

9. The invention set forth in claim 8 wherein each of said plate means includes a second edge perpendicular to said first edge any lying longitudinally along said tubes, a third edge perpendicular to said first edge and parallel to said second edge and the wall of said pressure vessel, and at least a fourth edge intersecting said second and third edges, said second, third and fourth edges being generally rounded and the area of said second and fourth edges near their intersection being adapted for contacting said shoulder and taper portions of said interconnector and sealing means.

10. The invention set forth in claim 9 wherein said interconnector and sealing means further include a resilient washer means axially aligned in said sleeve between adjoining ends of said tubes, said washer having an opening therein corresponding in size to and aligned with the openings of said tubes.

11. The invention set forth in claim 9 wherein said fourth edge intersects said second edge at an acute angle and said third edge at an obtuse angle and wherein said second edge includes a tapered portion for engaging said liner and said second and fourth edges are adapted for engaging said shoulder portion of said interconnector and sealing means.

12. The invention set forth in claim 9 wherein said support means intersects the faces of said plate means intermediate said second and third edges and is displaced from said first edge by a finite distance.

13. The invention set forth in claim 12 wherein said sleeve and antitelescoping device are each constructed of a material selected from the group consisting of metals and plastics and said sleeve liner is constructed of a material selected from the group consisting of rubber and synthetic resilient materials.

\* \* \* \* \*